Sept. 13, 1949.  A. BARNES  2,481,809
PROCESS FOR FORMING OPTICALLY SMOOTH, SCRATCH-RESISTANT
THERMOSETTING RESIN COATINGS ON SHEETS OR FILMS
OF SOFTER-ORGANIC PLASTIC MATERIALS
Filed Oct. 11, 1947
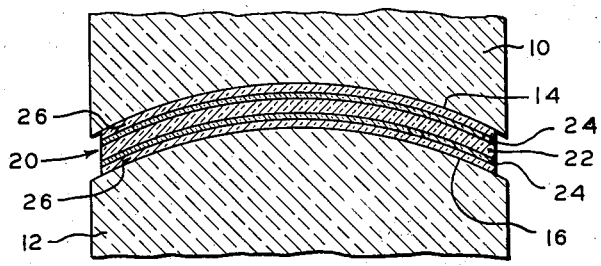
INVENTOR
Arthur Barnes
BY
Donald L. Brown
Attorney Patented Sept. 13, 1949

2,481,809

UNITED STATES PATENT OFFICE 2,481,809

PROCESS FOR FORMING OPTICALLY SMOOTH, SCRATCH-RESISTANT THERMOSETTING RESIN COATINGS ON SHEETS OR FILMS OF SOFTER ORGANIC PLASTIC MATERIALS

Arthur Barnes, Waltham, Mass., assignor to Polaroid Corporation, Cambridge, Mass., a corporation of Delaware Application October 11, 1947, Serial No. 779,272

6 Claims. (Cl. 18—60)

This invention relates to a new and improved process for forming optically smooth, scratch-resistant coatings on sheets or films of softer organic plastic materials.

An object of the invention is to provide a process for the formation of an optically smooth, scratch-resistant coating of a melamine or urea formaldehyde resin on a base sheet or film of other organic plastic material, and more specifically on a base sheet of a cellulose ester.

Other objects of the invention are to provide a process wherein a hard, scratch-resistant surface coating of the character described is formed by polymerizing a thin film of the scratch-resistant material in situ on the surface of the base sheet to which it may be suitably bonded, and by thereafter subjecting the coated sheet to a press polishing treatment between optically smooth mold elements under such conditions that the material of the sheet softens and conforms to the shape of the molds while the coating remains substantially hard and unsoftened, as a result of which the treated sheet is found to have optically smooth surfaces of a highly scratch-resistant, transparent resin.

Other objects will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing, which illustrates diagrammatically and in section the molding step performed in the process of the invention.

There has recently developed a demand for plastic optical elements such as lenses, viewing visors, panels, and the like, and more specifically for thin plastic lenses free from power for use in ophthalmic devices such, for example, as sunglasses. The demand is for optical products of this kind which possess optically smooth surfaces of such hardness as to effectively resist the cleaning treatments such, for example, as the wiping and polishing treatments to which ophthalmic lenses are subjected in use. This invention has for its major object the provision of a process for the production of coated plastic sheet materials from which lenses of the desired kind may be formed, or the production directly of such coated lenses, either flat or curved.

In the practice of the invention, a base sheet of a transparent organic plastic material has suitably bonded to it, either directly or by means of a suitable cement, a thin layer of a melamine formaldehyde resin or a urea formaldehyde resin, or a mixture thereof. The melamine-urea formaldehyde resin is then polymerized in situ by heat, for example, to provide on the surface of the plastic layer a transparent, scratch-resistant coating. The coated plastic is then placed between optically smooth mold elements, the opposed surfaces of which have the shape, conformation, and high polish which it is desired the finished sheet will possess. Heat is applied, for example a temperature adequate to so soften the base sheet that it will conform readily to the shape of the mold without appreciably softening the melamine-urea formaldehyde coating. While the mold is hot, a suitable press polishing pressure is applied to the mold elements and to the sheet positioned between them so that the sheet is caused to conform to the shape of the mold, with the base plastic layer flowing or conforming readily to the desired shape and conformation of the mold and the hardened coating adhering and conforming to the base plastic layer. The product is cooled and removed from the mold and is found to possess the desired properties of optical smoothness and surface hardness.

In the practice of the invention, any suitable light-transmitting plastic sheet may be employed, for example a sheet of a cellulose ester or ether, or a sheet of a vinyl compound such as polyvinyl alcohol or polyvinyl acetal, or any other plastic material to which the melamine formaldehyde coating may be directly or indirectly bonded. A preferred material for the base sheet is cellulose acetate butyrate or cellulose acetate propionate, and a preferred thickness for the base sheet is in the neighborhood of from .010 inch to .045 inch. Either or both surfaces of the base sheet may be coated with an adhesive to which the melamine formaldehyde resin will adhere. Where the base sheet is a cellulose ester such as cellulose acetate, cellulose butyrate, or cellulose propionate, the adhesive may comprise a thin film of cellulose nitrate which may be applied to the base sheet in solution and dried thereon. Where the base sheet is a vinyl compound such, for example, as polyvinyl alcohol, the adhesive layer may comprise a thin film or layer of a polyvinyl alcohol having a low OH content which may be dissolved in a mixture of water and alcohol and then applied to the base sheet, and which may be subsequently coated by a thin film of one or one-half second cellulose nitrate dissolved in any suitable solvent such as ethyl acetate.

The surface coating, which may comprise melamine formaldehyde resin or urea formaldehyde resin, or a mixture of melamine formaldehyde and urea formaldehyde in any desired proportions, is then applied to the coated base sheet and polymerized in situ on the surface of the sheet so as to provide a substantially smooth, scratch-resistant, transparent surface coating. Polymerization may be effected in any manner known to the art as, for example, by heat. Preferably, the layer of melamine or urea formaldehyde resin is a thin pellicle or filmlike layer of a thickness, for example, of .0001 inch to .0005 inch. After polymerization of the surface layer, the surfaced sheet is then positioned between suitable mold elements so shaped and formed as to impart any desired curvature to the finished product, and having optically smooth opposed molding surfaces. These elements may be of glass or of highly polished metal. The mold and the plastic within the mold are heated to a temperature such that the material forming the base sheet of the plastic lamination readily conforms to the shape of the mold. For example, where cellulose acetate butyrate comprises the base sheet, the temperature employed may be from 220° to 270° F. At this temperature, while the cellulose acetate butyrate conforms readily to the shape of the mold, the melamine formaldehyde coating remains hard and nonflowing. It is, however, of such thinness that it conforms, without cracking, to the shape of the plastic layer to which it has been applied. While the coated plastic is hot, it is pressed within the mold at pressures, for example, of from 100 to 600 pounds per square inch, and the properties of the molding surfaces are thus imparted to the surfaces of the plastic. The mold and its contents are then cooled and the molded sheet removed.

The drawing illustrates the process of the present invention. In the drawing, 10 and 12 indicate mold elements having optically smooth molding surfaces 14, 16. 20 indicates a plastic lamination positioned within the mold and comprising a central or base layer 22, adhesive layers on each surface thereof 24, and outer coatings of scratch-resistant urea formaldehyde resin 26.

It is to be understood that either or both surfaces of the plastic base sheet may be surfaced simultaneously or successively in the manner described. It is to be understood, moreover, that the process is applicable to the production of optical flats, to curved lenses such, for example, as ophthalmic six-diopter curve lenses, or even to other coated optical elements such, for example, as other lenses or prisms, or the like.

Furthermore, it is to be understood that where the base sheet comprises cellulose nitrate or some other material to which the melamine or urea formaldehyde may be directly applied and bonded, the intermediate adhesive layer or layers may be dispensed with.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. In the process of forming a scratch-resistant, optically smooth coating on the surface of transparent organic plastic material, the steps comprising polymerizing a thin coating of a resin from the class consisting of melamine formaldehyde, urea formaldehyde, and mixtures thereof on the surface of said plastic to form a scratch-resistant coating thereon, after the completion of said polymerization heating said coated plastic to a temperature below the softening point of said coating and at which the coating remains hard and the said organic plastic is softened, applying such pressure to said coated plastic while it is at said temperature and with an optically smooth molding surface in contact with said coating as to mold said plastic and the hard coating thereon to the shape and surface smoothness of said molding surface, cooling said coated plastic in the mold to a temperature below the softening point of said organic plastic and removing said cooled plastic from the mold.

2. The process as called for in claim 1 in which the scratch-resistant coating is of a thickness from .0001 inch to .0005 inch.

3. The process as called for in claim 1 in which the scratch-resistant coating is bonded to the said organic plastic by an adhesive comprising cellulose nitrate.

4. In the process of forming a scratch-resistant, optically smooth coating on the surface of an element comprising cellulose acetate butyrate, the steps comprising applying to said surface a thin layer of an adhesive comprising cellulose nitrate, applying thereto a thin layer of a resin from the class consisting of melamine formaldehyde, urea formaldehyde, and mixtures thereof, completely polymerizing said resin to provide a scratch-resistant coating, heating said coated element to a temperature below the softening point of said coating and from 220° to 270° F. to soften said cellulose acetate butyrate, bringing into contact with said scratch-resistant coating an optically smooth molding surface, applying to said coated cellulose acetate butyrate while it is in contact with said surface and while it is at said temperature a pressure of the order at least of 100 pounds per square inch to cause the scratch-resistant surface to acquire the optical smoothness of said molding surface, cooling said coated element in the mold to a temperature at which said cellulose acetate butyrate hardens and removing said coated element from the mold.

5. The process as called for in claim 4 in which the scratch-resistant surface is from .0001 inch to .0005 inch thick.

6. In the process of rendering optically smooth the exposed surface of a completely polymerized thin film of a resin of the class consisting of melamine formaldehyde, urea formaldehyde, and the mixtures thereof which has been applied as a coating to a layer of transparent organic plastic, the steps comprising heating said plastic and said coating to a temperature below the softening point of said coating and at which the plastic becomes moldable and the coating remains hard, pressing said coated plastic while at said temperature into engagement with an optically smooth surface whereby said plastic conforms to the shape of said surface and said coating acquires the smoothness thereof, cooling said coated plastic in the mold to a temperature at which said plastic hardens and removing said cooled plastic from the mold.

ARTHUR BARNES.

REFERENCES CITED

The following references are of record in the file of this patent:

UNITED STATES PATENTS

| Number | Name | Date |
| --- | --- | --- |
| 1,998,539 | Gams et al. | Apr. 23, 1935 |
| 2,121,077 | Ellis | June 21, 1938 |
| 2,197,357 | Widmer et al. | Apr. 16, 1940 |
| 2,320,533 | Muskat et al. | June 1, 1943 |
| 2,379,247 | Muskat | June 26, 1945 |
| 2,433,643 | Beach et al. | Dec. 30, 1947 |